United States Patent [19]
Sato et al.

[11] Patent Number: 5,803,301
[45] Date of Patent: Sep. 8, 1998

[54] SEAMLESS CAN AND PROCESS FOR MAKING THE SAME

[75] Inventors: Kazuhiro Sato; Nobuyuki Sato; Tomomi Kobayashi; Akira Kobayashi; Katsuhiro Imazu, all of Kanagawa, Japan

[73] Assignee: Toyo Seikan Kaisha, Ltd., Tokyo, Japan

[21] Appl. No.: 813,431

[22] Filed: Mar. 10, 1997

[30] Foreign Application Priority Data

Sep. 12, 1996 [JP] Japan .................................. 8-242067

[51] Int. Cl.⁶ .................................................. B65D 25/00
[52] U.S. Cl. ......................... 220/457; 220/454; 220/458; 220/906
[58] Field of Search ................................ 220/454, 457, 220/458, 906, 907

[56] References Cited

U.S. PATENT DOCUMENTS

| | | | |
|---|---|---|---|
| 3,360,157 | 12/1967 | Bolt et al. | 220/454 X |
| 3,872,994 | 3/1975 | Hyde | 220/906 X |
| 3,934,527 | 1/1976 | Saunders | 220/458 X |
| 4,452,374 | 6/1984 | Hitchcock et al. | 220/458 |
| 4,812,365 | 3/1989 | Saunders et al. | 220/454 X |
| 5,228,588 | 7/1993 | Aizawa et al. | 220/458 |

FOREIGN PATENT DOCUMENTS

| | | | |
|---|---|---|---|
| 1-46205 | of 0000 | Japan | B21D 22/28 |
| 51-4229 | of 0000 | Japan | B32B 27/36 |
| 56-501442 | of 0000 | Japan | B21D 22/28 |
| 59-34580 | of 0000 | Japan | B65D 8/16 |
| 7-5128 | of 0000 | Japan | B65D 1/18 |
| 3-101930 | 4/1991 | Japan | B32B 15/08 |
| 6-172556 | 6/1994 | Japan | C08J 5/18 |

*Primary Examiner*—Steven M. Pollard
*Attorney, Agent, or Firm*—Sughrue, Mion, Zinn, Macpeak & Seas, PLLC

[57] ABSTRACT

A shock resistant seamless can comprising a side wall having an inside surface and an outside surface formed from a laminate of a metal substrate and a thermoplastic resin layer provided on the inside surface of the can side wall, wherein the inner surface of the side wall resin layer opposite the metal substrate comprises a plurality of dotted projections.

9 Claims, 9 Drawing Sheets

CAN HEIGHT DIRECTION

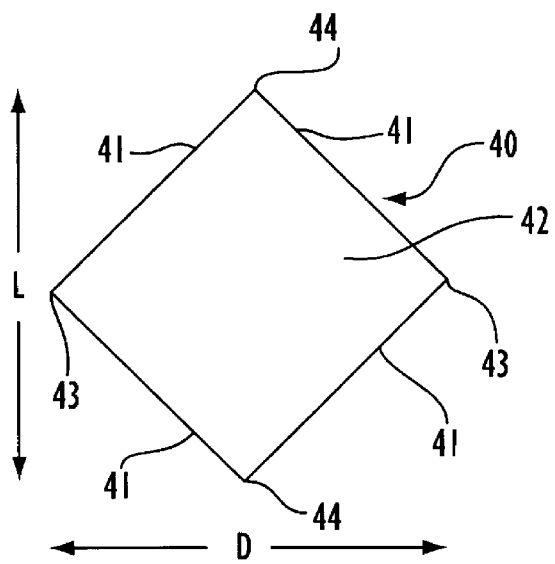
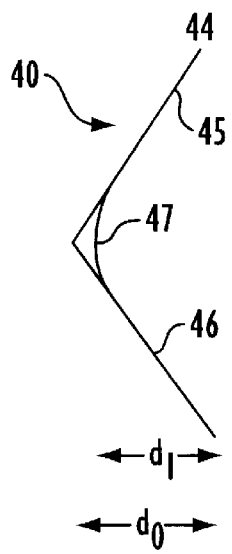
FIG. 11(a)　　　　FIG. 11(b)
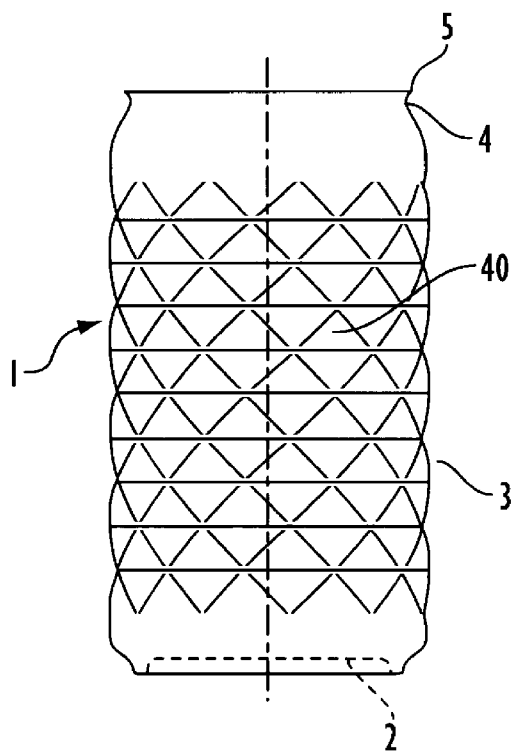
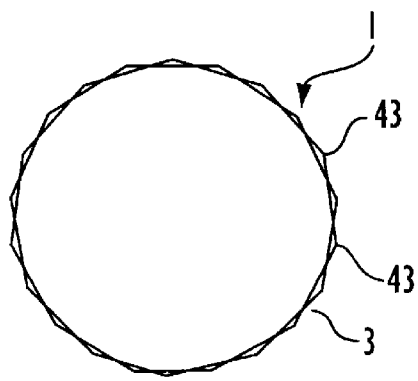
FIG. 12(a)　　　　FIG. 12(b)

SEAMLESS CAN AND PROCESS FOR MAKING THE SAME

FIELD OF THE INVENTION

The present invention relates to a seamless can comprising a laminate and a process for making the same. More specifically, the present invention relates to a seamless can comprising a laminate of a metal sheet and an organic resin layer which exhibits excellent shock resistance (dent resistance). The present invention also relates to a method for making the inventive seamless can having an excellent continuous can-making property.

BACKGROUND OF THE INVENTION

A side seamless can is produced, according to a conventional method, by subjecting a metal blank such as an aluminum plate, a tin plate or a tin-free steel plate, to at least one drawing stage. The drawing stage is conducted between a drawing die and a punch to form a cup comprising a barrel portion free of seams on the side surface thereof and a bottom portion integrally connected to the barrel portion which is also free of seams. Then, if desired, the barrel portion may be subjected to ironing between an ironing punch and a die to reduce the thickness of the barrel portion of the container. It is also known in the art to reduce the thickness of the side wall by bending and elongating the side wall at a curvature corner part of the redrawing die as described, for example, in JP-A-56-501442 (the term "JP-A" as used herein means an "unexamined published Japanese patent application").

Methods for coating an organic film onto the side seamless can include a method of applying an organic coating onto a formed can which is a common and widely used technique and, in addition, a method of laminating a resin film onto a metal blank before a can is formed. Furthermore, JP-B-59-34580 (the term "JP-B" as used herein means an "examined Japanese patent publication") describes a product obtained by laminating a polyester film derived from terephthalic acid and tetramethylene glycol onto a metal blank. Also, in the production of a can redrawn by bend-elongation, the use a metal sheet coated with a vinyl organosol, epoxy, phenolic, polyester or acryl is known in the art.

Various proposals have been made concerning the production of a polyester-coated metal sheet. For example, JP-A-51-4229 describes a coating film comprising polyethylene terephthalate which retains a biaxial orientation on the surface thereof, and JP-A-6-172556 proposes the use of a polyester film having a limiting viscosity [η] of 0.75 or more in the metal laminate.

Furthermore, JP-A-3-101930 describes a coated metal sheet for drawn cans comprising a laminate of a metal sheet, a polyester film layer mainly consisting of an ethylene terephthalate unit and, if desired, an adhesion primer layer interposed between the metal sheet and the polyester film. The polyester film layer has an x-ray diffraction intensity defined by the following formula of from 0.1 to 15:

Rx=IA/IB wherein IA represents an X-ray diffraction intensity on the diffraction surface placed in parallel with the polyester film surface at a spacing of about 0.34 nm (the angle of diffraction by CuKα X rays is from 24° to 28°) and IB represents an X-ray diffraction intensity on the diffraction surface placed in parallel with the polyester film surface at a spacing of about 0.39 nm (the angle of diffraction by CuKα X rays is from 21.5° to 24°), and the anisotropy index in the in-plane orientation of a crystal is 30 or less. This patent publication also describes a thin-walled drawn can obtained by subjecting the above-described coated metal sheet to drawing-redrawing formation including bending and elongating the side wall portion of the can barrel in the redrawing step to reduce the wall thickness.

The above-described conventional techniques are advantageous in that a resin film is applied onto a metal blank before a can is formed. This dispenses with the need for a baking furnace for the coating film or a facility for processing the exhaust gas of coatings that is usually required in a coating process. Also, this technique causes no air pollution and further can dispense with the need for spray coating after a can is formed. However, much improvement is still desired with respect to various can properties, especially shock resistance (dent resistance), corrosion resistance, and double seaming and sealing properties.

More specifically, when a laminate sheet obtained by laminating an organic film on a metal blank is subjected to drawing or drawing-ironing to form a seamless can, the resin film on the can side wall portion is molecularly oriented in the can height direction. This molecular orientation improves the barrier property of the resin layer against corrosive components and also improves heat resistance. However, at the same time, the resin tends to fibrillate due to this orientation. As a result, an applied shock tends to crack the resin layer in the can height direction, which in turn reduces the dent resistance of the can.

SUMMARY OF THE INVENTION

It is therefore an object of the present invention to provide a seamless can formed from a laminate of a metal blank and an organic resin layer having markedly improved dent resistance even though the thermoplastic resin layer is molecularly oriented in the can height direction, and a process for making the same.

Another object of the present invention is to provide a process of continuously making a seamless can at high speed having improved dent resistance.

The present invention provides a shock resistant seamless can formed from a laminate of a metal substrate and a thermoplastic resin layer, wherein a large number of dotted projections are present on a part of or over the entire inner surface of the side wall resin layer. The resin layer is provided on the inside surface of the can side wall, and the inner surface of the side wall resin layer is the surface opposite the metal substrate. Furthermore, the dotted projections provide an orientation relaxation part. That is, the dotted projections relax the molecular orientation of the side wall resin layer.

Preferred embodiments of the seamless can of the present invention are as follows.

1. The resin of the side wall resin layer provided on the inside surface of the can side wall is molecularly oriented in the can height direction, the dotted projections have a birefringence ($\Delta n_p$) smaller than the birefringence of the parts of the resin layer which do not have the dotted projections ($\Delta n_o$), and the difference in birefringence ($\Delta n_o - \Delta n_p$) between the parts of the resin layer which do not have the dotted projections and the dotted projections of the resin layer, determined by a birefringence method and where birefringence ($\Delta n$) is defined by the following formula (1), is from 0.002 to 0.180:

$$\Delta n = n_h - n_t \tag{1}$$

wherein $n_h$ is a refractive index of the resin layer in the can height direction and $n_t$ is a refractive index in the thickness direction of the resin layer.

2. The individual dotted projections have an area of from 0.03 to 0.8 mm$^2$ and a height of from 0.1 to 2.0 μm, and the ratio of the area occupied by the dotted projections is from 5 to 50% per unit area of the parts having the dotted projections.

According to the present invention, a process for making a seamless can is also provided, comprising subjecting a laminate of a metal substrate and a thermoplastic resin layer to drawing-redrawing or to drawing-redrawing and ironing, wherein an end stage of the redrawing or ironing formation comprises engaging a punch with the surface of the resin layer provided opposite the metal substrate, said punch comprising a side wall having formed on a part of or over the entire surface of said punch side wall a plurality of dotted recessions, the individual dotted recessions have an area of from 0.03 to 0.8 mm$^2$ and a height of from 0.1 to 2.0 μm, and the ratio of the area occupied by the dotted recessions is from 5 to 50% per unit area of the parts having the dotted recessions.

The file of this patent contains at least one drawing executed in color. Copies of this patent with color drawing(s) will be provided by the Patent and Trademark Office upon request and payment of the necessary fee.

BRIEF DESCRIPTION OF THE DRAWINGS

FIGS. 11(a) and 11(b) are two views showing a constituent unit face of a polyhedron wall formed on the side surface of a seamless can, where FIG. 11(a) is a plan view and FIG. 11(b) is a vertical cross section of the constituent unit face; and FIGS. 12(a) and 12(b) are two views showing a seamless can having provided on the can side surface thereof a polyhedron wall so as to improve deformation resistance, where FIG. 12(a) is a side view and FIG. 12(b) is a horizontal cross section.

DETAILED DESCRIPTION OF THE INVENTION

Figure 1:
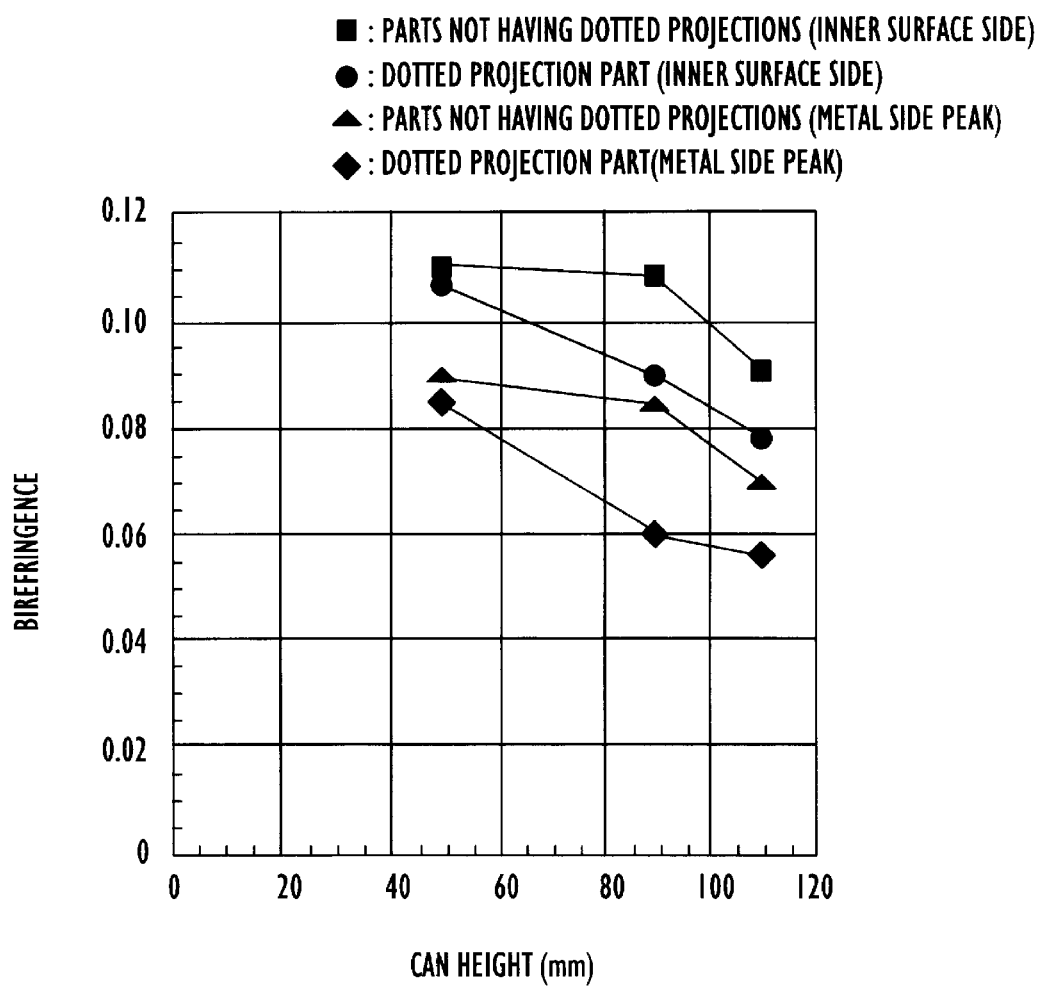
FIG. 1 is a graph plotting the relationship between the position in the can height direction and the birefringence of those parts of the can side wall resin layer which have dotted projections and the birefringence of those parts of the can side wall resin layer which do not have dotted projections, including the birefringence at the inner surface side and the metal side peak of the side wall resin layer.

The present invention relates to a seamless can formed from a laminate of a metal substrate and a thermoplastic resin layer. A large number of dotted projections are formed on a part of or over the entire inner surface of the side wall resin layer, and the dotted projections provide an orientation relaxation part. Furthermore, the can exhibits markedly improved dent resistance due to the orientation relaxation part.

A denting test is carried out to evaluate the practical characteristics of a can which are important for canning. This test is performed because canned products can fall or collide with each other to form a dent. When a predetermined shock is applied to a can body to generate a dent, this test determines whether the inside surface protective resin layer is damaged or peeled, and whether the corrosion resistance and metal exposure inhibitory property is maintained.

As discussed above, in a seamless can obtained by subjecting the above-described laminate to drawing-redrawing or drawing-redrawing and ironing formation, the thermoplastic resin layer in a denting test tends to develop cracks in the can height direction, and the exposed metal is likely to corrode (see Comparative Examples 1 to 8 described below). This tendency is noticeable when the drawing ratio in the can height direction is large or the degree of reduction in the thickness of the side wall portion is large. On the other hand, when a large number of dotted projections are formed on a part of or over the entire inner surface of the side wall resin layer, the problem of thermoplastic resin layer cracking is remarkably overcome in a denting test. Furthermore, the corrosion resistance and metal exposure inhibitory properties are remarkably improved (see Examples 1 to 14 described below).

In the present invention, dent resistance, that is, a combination of shock resistance and corrosion resistance or metal exposure inhibitory property, is considered to be improved by forming a large number of dotted projections on the inner surface of the side wall resin layer for the following reasons.

In a seamless can as described above, the can inside surface side wall resin layer tends to crack due to the molecular orientation in the can height direction. Furthermore, the dotted projections formed on the inner surface of the side wall resin layer impart turbulence to the molecular orientation of the resin layer as a whole. That is, the dotted projections provide an orientation relaxation part. This turbulence is considered to prevent cracking of the resin layer even on impact.

On the other hand, a dotted projection initially is a part which readily concentrates stress. Also, it is considered that metal fatigue, resin layer cracking, resin layer peeling or the like readily occurs at this part. However, in the seamless can of the present invention, the dotted projections form an orientation relaxation part having considerable elasticity and metal adhesion. Therefore, even at the dotted projections which readily concentrate stress, resin layer cracking, resin layer peeling or the like tends not to occur. Thus, the seamless can of the present invention having dotted projections provides excellent dent resistance without incurring other problems.

By measuring the birefringence of the side wall resin layer in the can barrel upper portion having a strong uniaxial orientation in the can height direction, the present inventors found that the degree of molecular orientation at the dotted projections is reduced as compared with other parts of the side wall resin layer. FIG. 1 shows the birefringence of the dotted projections and other parts of the side wall resin layer at the upper portion of the can. Also, FIG. 1 shows the birefringence at the inner surface side and the metal side peak of the side wall resin layer. The metal side is the side of the resin layer which is closest to the metal sheet constituting the can side wall. However, considering that the birefringence of the resin layer varies in the thickness direction from the surface layer side to the metal side and furthermore, that a birefringence peak is present at the metal side, the birefringence ($\Delta n$) of the dotted projections and of those parts which do not have the dotted projections is shown for both the inner surface side and the metal side peak.

Molecular orientation of the side wall resin layer, index of refraction measurements in the can height and thickness directions of the side wall resin layer, and a method for determining birefringence peaks along the thickness direction of the side wall resin layer including the metal side peak are described in U.S. application Ser. No. 08/613,197 filed Mar. 6, 1996 which is incorporated herein by reference in its entirety.

In order to obtain a seamless can having no disadvantages resulting from the formation of dotted projections and having excellent dent resistance, more preferably, the resin layer provided on the inside surface of the can side wall has a molecular orientation in the can height direction, the dotted projections have a birefringence ($\Delta n_p$) smaller than that of the parts which do not have the dotted projections ($\Delta n_o$), and the difference in birefringence ($\Delta n_o - \Delta n_p$) between the parts that do not have the dotted projections and the dotted projections of the resin layer, measured by a birefringence method and where birefringence ($\Delta n$) is defined by the following formula (1), is from 0.002 to 0.180:

$$\Delta n = n_h - n_t \qquad (1)$$

wherein nh is a refractive index in the can height direction of the film (resin layer) and $n_t$ is a refractive index in the thickness direction of the film (resin layer).

If the difference in the resin layer surface side birefringence ($\Delta n$) between the parts which do not have the dotted projections and the dotted projections of the resin layer is too small, the effect of orientation relaxation is not obtained. If this difference is too large, the degree of orientation of the parts which do not have the dotted projections is too high and the resin layer tends to crack in the parts which do not have the dotted projections.

In the present invention, a large number of dotted projections are formed on the inner surface of the side wall resin layer in the redrawing formation or in the ironing formation using a punch having formed on a part of or over the entire surface of the punch side wall a large number of dotted recessions, by engaging the punch with the inner surface of the side wall resin layer to transfer the shape of the punch side wall surface to the inner surface of the side wall resin layer. Thus, the method of the present invention is very simple and easy to apply.

Figure 2:
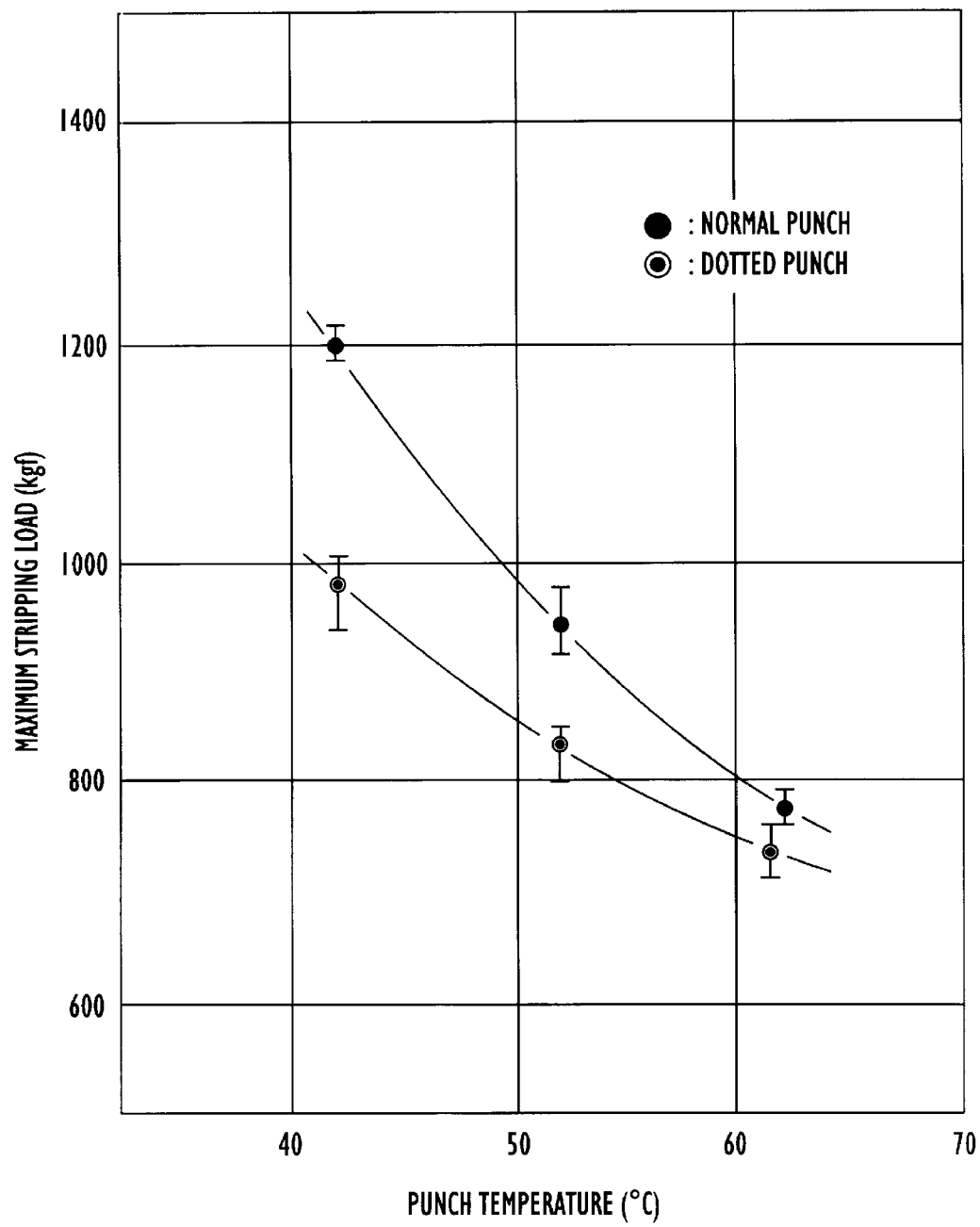
FIG. 2 is a graph plotting the stripping load of the can from the punch as a function of temperature in the case of using a punch having dotted recessions and in the case of a typical punch having no dotted recessions at a stripping speed of 83 mm/s (maximum load)

According to the present invention, by forming a large number of dotted projections on the inner surface of the side wall resin layer using a punch having dotted recessions, the stripping load of a can from the punch can be lowered and resin build-up on the punch can be reduced. As a result, barrel breakage or rollback, which are problems in continuous can-making, can be prevented and continuous productivity is advantageously improved. Rollback is a phenomenon in which it is difficult to remove the can barrel from the punch and the flange is curled due to resistance on stripping. Build-up is a phenomenon in which fine pieces of resin attach to the punch. FIG. 2 is a view plotting the stripping loads of the can from the punch at various temperatures when a punch having dotted recessions is used and when a regular punch having no dotted recessions is used. FIG. 2 shows that the stripping load is reduced when a punch having dotted recessions is used. It is considered that this result is obtained because the dotted projections formed on the inner surface of the side wall resin layer provide a wedge effect to accelerate release of the can inside surface side wall resin layer from the punch surface.

It is important that the projections formed on the inner surface of the side wall resin layer have a dot shape. When the projection is in the form of line shape, an orientation relaxation part capable of effectively preventing the resin layer from cracking is difficult to form and the corrosion resistance tends to decrease. Furthermore, the stripping property from the punch, described below, is also reduced.

In the seamless can of the present invention, the individual dotted projections have an area of from 0.03 to 0.8 mm² and a height of from 0.1 to 2.0 μm, and the ratio of the area occupied by the dotted projections is from 5 to 50% per unit area of the portion having the dotted projections.

The dotted projections may be provided on a part of or over the entire inner surface of the side wall resin layer. However, the dotted projections are effectively provided at the can barrel upper portion where the resin layer has a high uniaxial orientation, more specifically, on a part that is 30% or more, preferably 50% or more, of the can height beneath the flange part.

If the individual dotted projections have an area of less than 0.03 mm² or a height of less than 0.1 μm, the effect of preventing the resin layer from cracking due to applied shock is low. If the individual dotted projections have an area somewhat larger than 0.8 mm² or a height exceeding 2.0 μm, in the drawing-redrawing formation or the ironing formation, the stripping load from the punch increases and the stripping property of the can formed from the punch may be poor.

If the ratio of the area occupied by the dotted projections is less than 5% per unit area of the parts having the dotted projections, the effect of preventing the resin layer provided on the inside surface of the side wall from cracking is practically insufficient, whereas if the above-described area ratio exceeds 50% per unit area of the parts having the dotted projections, the stripping load from the punch increases and the stripping property from the punch is reduced to readily cause barrel breakage, rollback or resin build-up.

According to the present invention, in making a seamless can from the laminate of a metal substrate and a thermoplastic resin layer, by using a punch having dotted recessions as a punch for the redrawing formation or the ironing formation, the dent resistance is remarkably improved. At the same time, the stripping load of a can from the punch can be lowered and build-up of resin on the punch can be reduced. As a result, an effect is provided such that barrel breakage or rollback, which are problems in continuous can-making, can be prevented and continuous can-making productivity is advantageously improved.

PREFERRED EMBODIMENTS OF THE INVENTION

Figure 3:
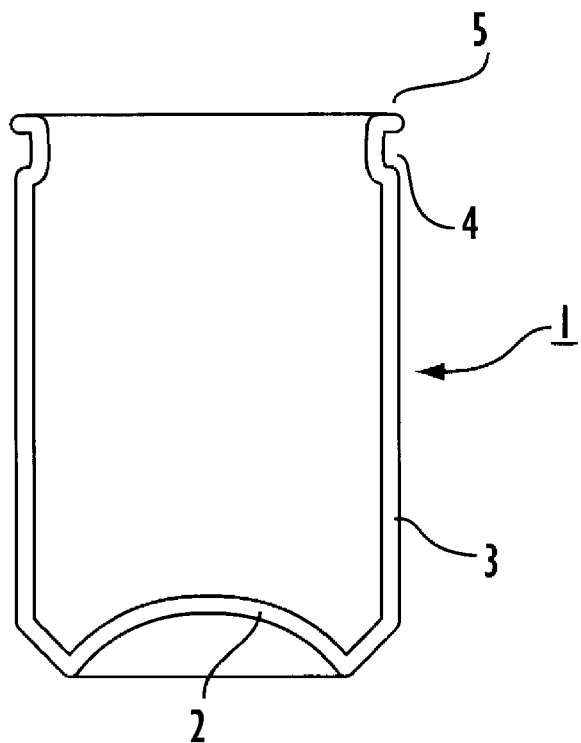
FIG. 3 is a side cross section showing one example of the seamless can of the present invention.

FIG. 3 shows one example of the seamless can of the present invention. The seamless can 1 is formed by drawing and bend-elongating or further ironing the above-described thermoplastic resin-metal laminate. The seamless can comprises a bottom portion 2 and a side wall portion 3. On the upper edge of the side wall portion 3, a flange portion 5 is formed through a neck portion 4, if desired. In the can 1, the side wall portion 3 is reduced in thickness as compared with the bottom portion 2, by bend-elongation or further by ironing, to have a thickness of from 30 to 100%, preferably from 30 to 85%, of the original thickness of the laminate.

Figure 4:
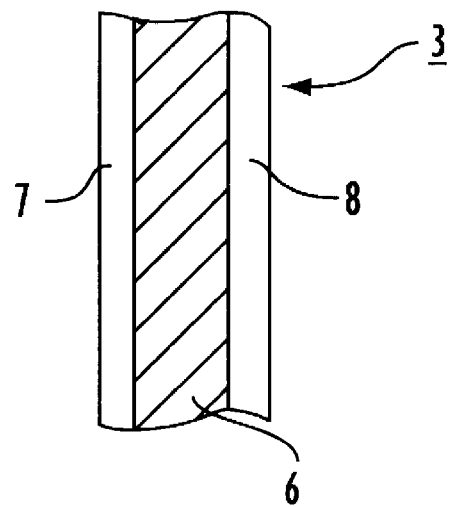
FIG. 4 is a view showing one example of the cross-sectional structure of the side wall portion of the seamless can.

FIG. 4 shows one example of the cross-sectional structure of the side wall portion 3. The side wall portion 3 comprises a metal substrate 6 and an inside surface thermoplastic resin layer 7. An outside surface film 8 is provided on the metal substrate 6. The outside surface film 8 may be the same as the resin inside surface layer 7, or may be a paint or a resin film coating that is usually used for cans.

Figure 5:
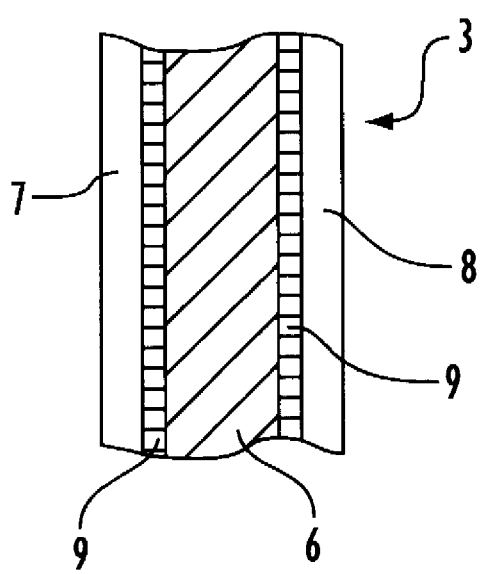
FIG. 5 is a view showing another example of the cross-sectional structure of the side wall portion of the seamless can.

FIG. 5 shows another example of the cross-sectional structure of the side wall portion. FIG. 5 differs from FIG. 4 in that a primer layer 9 for adhesion is provided between the thermoplastic resin layer 7 and the metal substrate 6.

The cross-sectional structure of the bottom portion 2 is generally the same as the cross-sectional structure of the side wall portion 3, except that dotted projections are not formed thereon and working to reduce the thickness is not applied.

The seamless can of the present invention is formed from the above-described laminate and has a large number of dotted projections on a part of or over the entire inner surface of the side wall resin layer 7. The individual dotted projections have an area of from 0.03 to 0.8 mm$^2$, preferably from 0.05 to 0.7 mm$^2$, and a height of from 0.1 to 2.0 $\mu$m, preferably from 0.2 to 1.8 $\mu$m. Also, the ratio of the area occupied by the dotted projections is preferably from 5 to 50% per unit area of the parts having the dotted projections.

This seamless can may be produced, in the redrawing or ironing formation at the final stage of can production, by engaging a punch having formed on a part of or over the entire surface of the punch side wall a large number of dotted recessions with the inner surface of the side wall resin layer to transfer the shape of the dotted recessions thereon. The individual dotted recessions have a dimension and area characteristic corresponding to the above-described dotted projections.

The dimensions of the dotted projections on the inner surface of the side wall resin layer of the seamless can and the dimensions of the dotted recessions of the punch may be determined by various methods. However, a fairly high precision measurement can be obtained using a three-dimensional contact roughness gauge.

Figure 6:
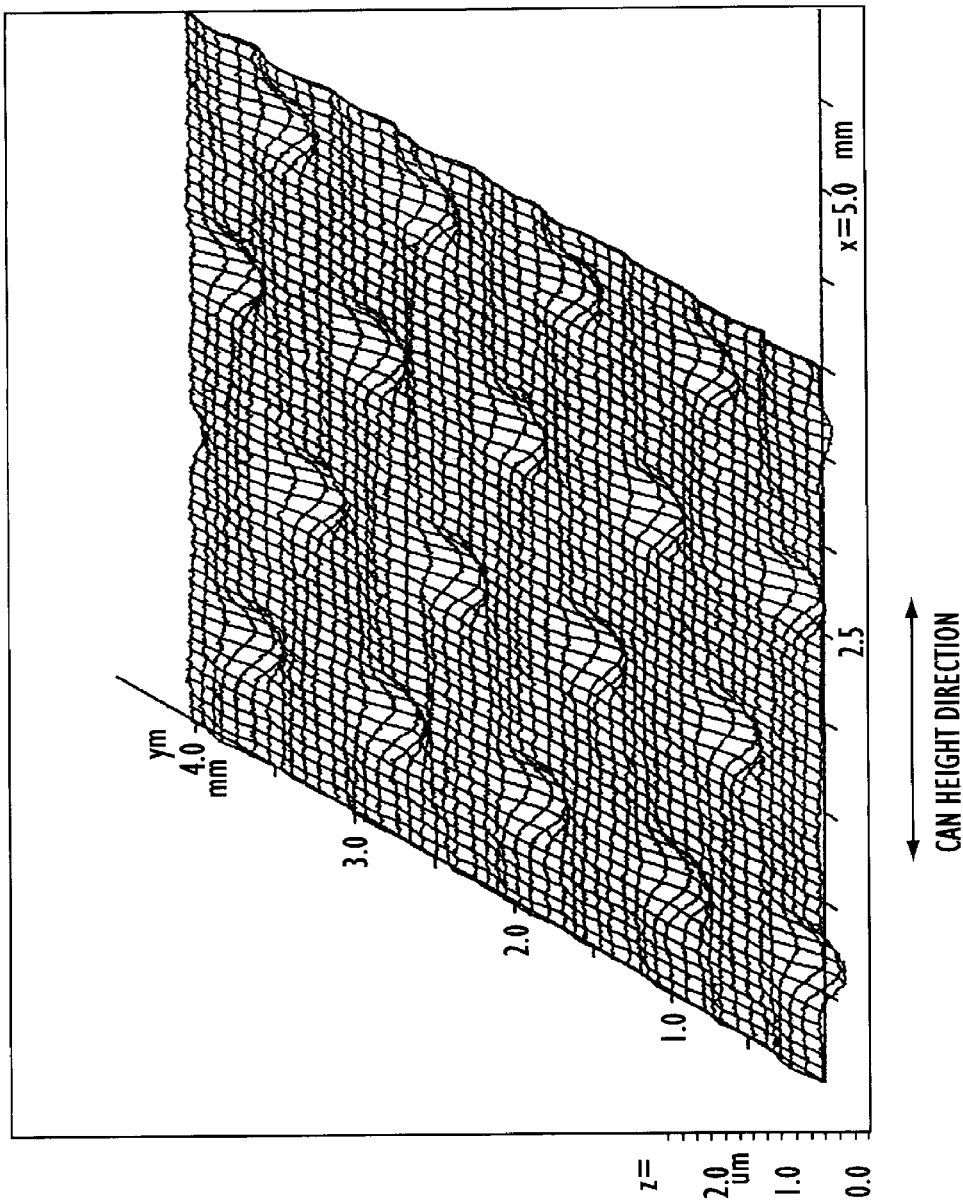
FIG. 6 is a three-dimensional profile showing one example of the side surface of a punch for use in the present invention based on roughness values obtained with a three-dimensional surface roughness gauge.
Figure 7:
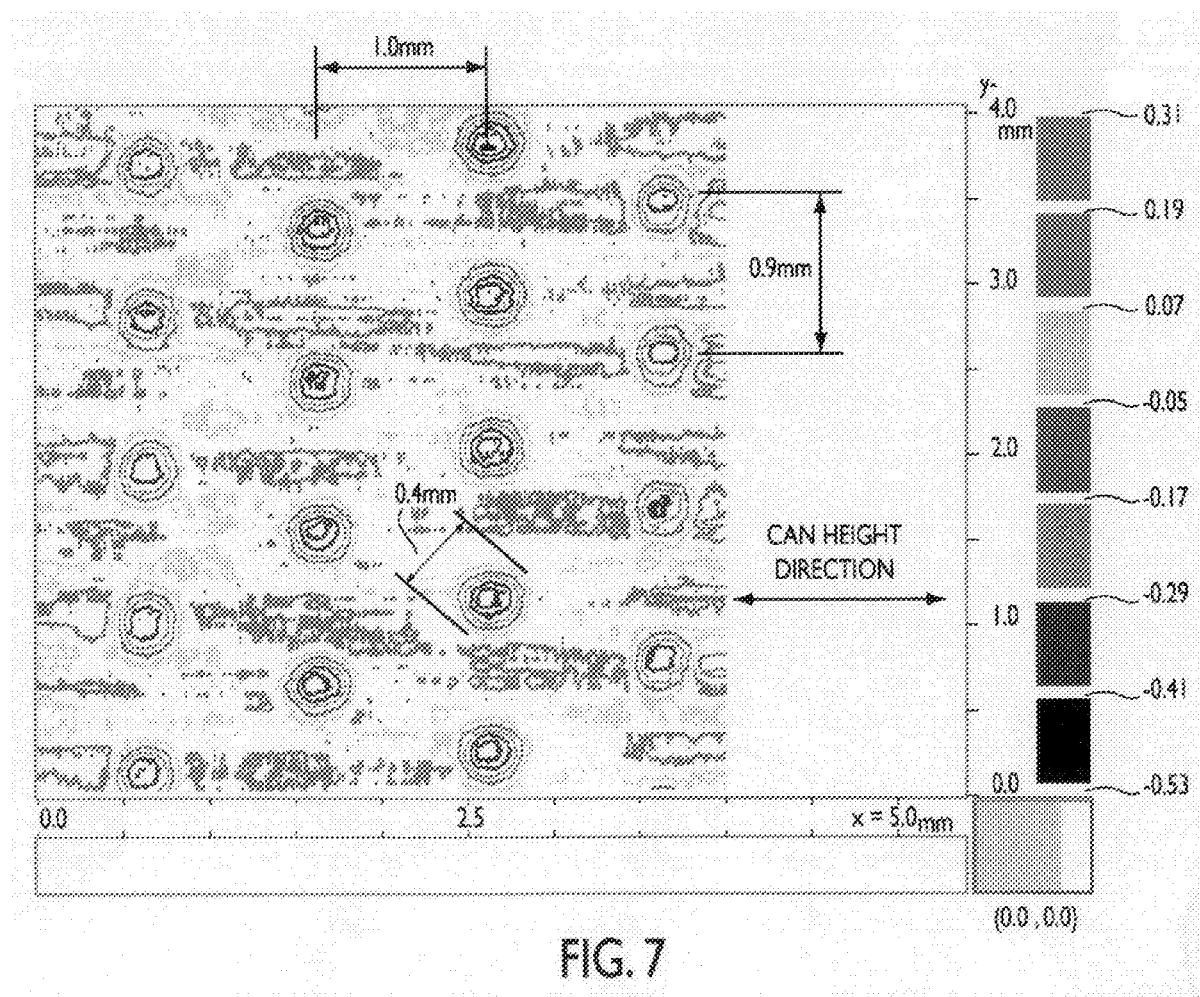
FIG. 7 is a view showing the inner surface of the side wall resin layer in one example of the seamless can of the present invention, as a contour map based on roughness values obtained with a three-dimensional contact roughness gauge.

FIG. 6 is a view showing the side surface in one example of the punch for use in the present invention, as a three-dimensional profile based on the roughness values obtained by a three-dimensional contact roughness gauge. FIG. 7 is a view showing the inner surface of the side wall resin layer in one example of the seamless can of the present invention, as a contour map based on the roughness values obtained by a three-dimensional contact roughness gauge. From this map, the dimensions and the area ratio can be easily calculated.

Figure 8A:
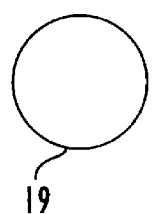
FIGS. 8(a) to 8(f) are views showing several examples of the shape of the dotted projections on the inner surface of the side wall resin layer or of the dotted recessions on the punch.
Figure 8B:
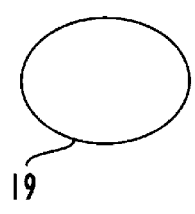
Figure 8C:
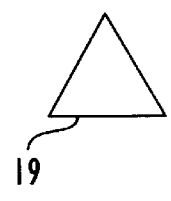
Figure 8D:
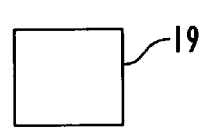
Figure 8E:
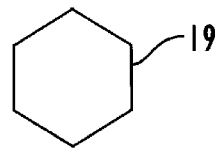
Figure 8F:

The dotted projections on the inner surface of the side wall resin layer or the dotted recessions on the punch are individually present and independent from one another. The dot 19 may have any shape such as a circle as shown in FIG. 8(a), an ellipse as shown in FIG. 8(b), a triangle as shown in FIG. 8(c), a quadrangle as shown in FIG. 8(d), a hexagon as shown in FIG. 8(e) or an egg shape as shown in FIG. 8(f), however, a circular form or a polygonal form with rounded corners is preferred.

The surface shape of the dotted projections or the dotted recessions is preferably a curved surface such that the center is highest (deepest) in order to enhance the dent resistance and stripping property from a punch. For example, a curved surface such as spherical surface, ellipsoid, paraboloid or hyperboloid is preferred. Of course, the cross-sectional shape is not restricted to the above-described curved surfaces, and a trapezoid with rounded corners or a truncated cone may be used.

Disposition of the dotted projections or the dotted recessions is not particularly limited as long as the above-described area ratio can be obtained, and the dotted projections or recessions may be disposed either regularly or randomly. Examples of a regular disposition include a checker, slanted checker, rhombus, triangle and hexagon disposition, and examples of a random disposition include a fractal disposition.

In the present invention, various surface-treated steel plates and light metal sheets such as aluminum may be used as the metal substrate of the laminate.

The surface-treated steel plate includes those obtained by annealing a cold-rolled steel plate, subjecting it to rolling with a tempering of from 0.1 to 30% or secondary cold rolling, and applying thereon one or more surface treatments such as zinc plating, tin plating, nickel plating, treatment with an electrolytic chromic acid and treatment with chromic acid. A preferred example of the surface-treated steel plate is a steel plate treated with electrolytic chromic acid. The treated surface comprises from 10 to 200 mg/m$^2$ of a metal chromium layer and from 1 to 50 mg/m$^2$ (in terms of chromium metal) of a chromium oxide layer. This treatment in particular provides excellent coating adhesion and corrosion resistance in combination. Another example of the surface-treated steel plate is a hard tin plate having a tin plating amount of from 0.5 to 11.2 g/m$^2$. This tin plate is preferably subjected to treatment with chromic acid or treatment with chromic acid-phosphoric acid to provide a chromium amount in terms of chromium metal of from 1 to 30 mg/m$^2$.

Still another example is an aluminum-coated steel plate subjected to aluminum plating or aluminum press-adhesion.

The light metal plate includes an aluminum plate and an aluminum alloy plate. The aluminum alloy plate having excellent corrosion resistance and workability has a composition where Mn is from 0.2 to 1.5 wt %, Mg is from 0.8 to 5 wt %, Zn is from 0.20 to 0.3 wt % and Cu is from 0.15 to 0.45 wt % with the balance being Al. The light metal plate is also preferably subjected to treatment with chromic acid or to treatment with chromic acid/phosphoric acid to provide a chromium amount in terms of chromium metal of from 20 to 300 mg/m$^2$.

The blank thickness of the metal plate, namely, the thickness (tB) of the can bottom portion, varies depending upon the kind of metal or the use or size of the container. However, the thickness (tB) in general is preferably from 0.10 to 0.50 mm and more preferably, in the case of a surface-treated steel plate, from 0.10 to 0.30 mm and in the case of a light metal plate, from 0.15 to 0.40 mm.

Examples of the thermoplastic resin for use as the resin layer provided on the inside surface of the can side wall include low density polyethylene, high density polyethylene, polypropylene, poly 1-butene, poly 4-methyl-1-pentene, polyolefins such as random and block copolymers of α-olefins such as ethylene, propylene, 1-butene or 4-methyl-1-pentene, ethylene-vinyl compound copolymers such as ethylenevinyl acetate copolymer, ethylene-vinyl alcohol copolymer and ethylene-vinyl chloride copolymer, styrene-base resins such as polystyrene, acrylonitrile-styrene copolymer, ABS and α-methylstyrene-styrene copolymer, polyvinyl compounds such as polyvinyl chloride, polyvinylidene chloride, polyvinyl chloride-vinylidene chloride copolymer, polymethyl acrylate and polymethyl methacrylate, polyamides such as nylon 6, nylon 6—6, nylon 6—10, nylon 11 and nylon 12, thermoplastic polyesters such as polyethylene terephthalate and polybutylene terephthalate, polycarbonate, polyphenylene oxide, and mixtures thereof.

Among these thermoplastic resins, polyester-base resin is particularly suitable in view of workability, corrosion resistance and flavor retentivity of the can contents.

The polyester-base film for use in the present invention is preferably a homopolyester or copolyester derived from a dibasic acid mainly comprising terephthalic acid and a diol mainly comprising ethylene glycol.

Example of the dibasic acid include, in addition to terephthalic acid, isophthalic acid, P-β-oxyethoxybenzoic acid, naphthalene-2,6-dicarboxylic acid, diphenoxyethane-4,4-dicarboxylic acid, 5-sodium sulfoisophthalic acid, hexahydroterephthalic acid, adipic acid and sebacic acid.

Examples of the diol component include, in addition to ethylene glycol, glycol components such as propylene glycol, 1,4-butanediol, neopentyl glycol, 1,6-hexylene glycol, diethylene glycol, triethylene glycol, cyclohexanedimethanol and an ethylene oxide adduct of bisphenol A.

The acid component of the copolyester preferably comprises a terephthalic acid and an isophthalic acid in view of workability and mechanical properties, particularly in view of flavor retentivity. The acid component may contain other dibasic acid components in a small amount, for example, in an amount of 1 mol % or less. However, in order to prevent the adsorption of flavor components and to suppress the elution of polyester components, at least the container inner surface polyester layer preferably does not contain an aliphatic dibasic acid. A polyester containing an isophthalic acid as the acid component provides a large barrier effect against various components, flavor components or corrosive components and also reduces adsorption of these components.

As the diol component of the copolyester, those mainly comprising ethylene glycol are preferred. In view of molecular orientation and barrier properties against corrosive components and flavor components, the diol component preferably comprises ethylene glycol in a proportion of 95 mol % or more, more preferably 98 mol % or more.

The homopolyester or copolyester must have a molecular weight in a range which is capable of film formation, and preferably has an intrinsic viscosity (η) measured using a phenol/tetrachloroethane mixed solvent of from 0.5 to 1.5, preferably from 0.6 to 1.5.

The polyester layer suitably used as the thermoplastic resin layer may be a film comprising a single homopolyester or copolyester, a blend film comprising two or more of these polyesters, or a laminate comprising two or more polyester films.

The thickness of the thermoplastic resin layer for use in the present invention as a whole is preferably from 2 to 100 μm, more preferably from 5 to 50 μm in view of its effect on metal protection and workability.

Known compounding agents for resins, for example, an antiblocking agent such as amorphous silica, a pigment such as titanium oxide (titanium white), various antistatic agents, a lubricant, an antioxidant and a stabilizer may be added to the thermoplastic resin layer according to a known formulation.

The laminate for use in the present invention may be produced by heat-adhering the above-described metal substrate and the thermoplastic resin film or by extrusion coating the thermoplastic resin onto the metal substrate. In order to reinforce corrosion resistance and adhesion, in the case of a laminate system, an adhesion primer may previously be coated on the metal substrate or on the thermoplastic resin layer, and in the case of an extrusion coating method, an adhesion primer may previously be applied onto the metal substrate.

Generally, the thermoplastic resin layer such as a polyester-base film must be biaxially stretched. This is because when a biaxially stretched film is used, the laminate is improved in workability and the inner surface coating has improved heat resistance and barrier properties. The degree of biaxial orientation can be verified by an X-ray diffraction method, a polarized fluorometric method, a birefringence method or a density gradient piping method.

Although not generally needed, in case of using an adhesion primer, and in order to increase adhesion of the primer for adhesion to the film, the surface of the biaxially stretched polyester film in general is preferably subjected to a corona discharge treatment. The corona discharge treatment is preferably carried out to the extent that the wet tension is 44 dyne/cm or more.

In addition, the film may be subjected to a known surface treatment for improving adhesion such as plasma treatment or flame treatment or to a coating treatment for improving adhesion with a urethane resin or a modified polyester resin.

Figure 9:
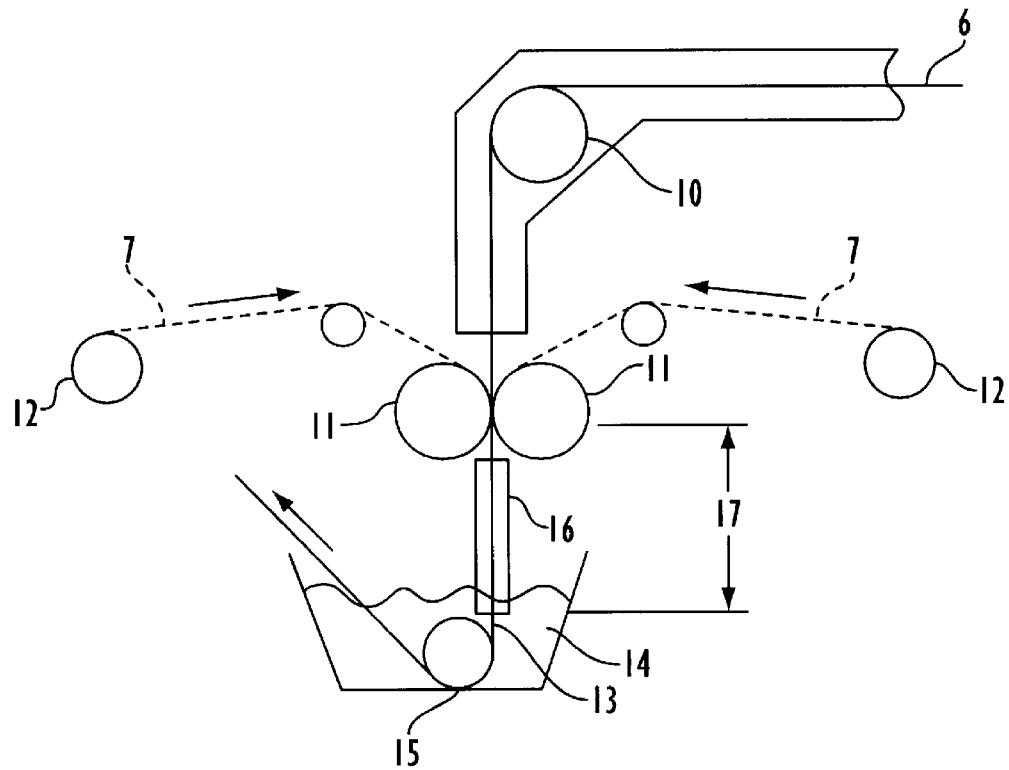
FIG. 9 is a diagrammatic view of a method for producing the thermoplastic resin layer-metal laminate.

FIG. 9 is a diagrammatic view of a method for producing the thermoplastic resin (polyester) film-metal laminate. The metal sheet 6 is heated by a heating roller 10 at a temperature (T1) higher than the melting point (Tm) of the polyester, and then fed between laminate rollers 11, 11. On the other hand, polyester film 7 is unwound from feeding rollers 12 and fed through the laminate rollers 11, 11 so as to position the metal sheet 6 sandwiched therebetween. The laminating rollers 11, 11 are kept at a temperature (T2) slightly lower than that of the heating roller 10 to heat-bond the polyester films onto both surfaces of the metal sheet 6. At the lower side of the laminate rollers 11, 11, a water tank is provided containing cooling water 14 for quenching the laminate 13 thus formed. A guide roller 15 for guiding the laminate is disposed in the water tank. Between the laminate rollers 11, 11 and the cooling water 14, a gap 17 having a predetermined distance is formed, and a heat-reserving mechanism 16 may be provided in the gap 17 to maintain a constant temperature range (T3).

The heating temperature (T1) of the metal sheet is generally from (Tm−50° C.) to (Tm+100° C.), more preferably from (Tm−50° C.) to (Tm+50° C.). The temperature (T2) of the laminate rollers 11 is suitably from (T1−300° C.) to (T1−10° C.), preferably from (T1−250° C.) to (T1−50° C.).

In the case of an extrusion coating method, instead of obtaining the polyester film from the feeding roller, a molten polyester is extracted as a film from the extrusion die and laminated in the same manner by the laminate roller. In this extrusion coating method, the thermoplastic resin layer of the laminate thus produced is naturally unoriented.

In the extrusion coating, the heating temperature (T1) of the metal sheet in general is suitably from (Tm−150° C.) to (Tm+50° C.), and the temperature (T2) of the laminate roller is suitably from 20° C. to Tm.

The adhesive primer provided, if desired, between the film such as a polyester film and the metal blank exhibits excellent adhesion both to the metal blank and to the film. Representative examples of the primer coating having excellent adhesion and corrosion resistance include a phenol-epoxy based coating comprising a resol-type phenolaldehyde resin derived from various phenols and formaldehyde, and a bisphenol-type epoxy resin. A coating containing a phenol resin and an epoxy resin at a weight ratio of from 50:50 to 2:98, preferably from 40:60 to 5:95, is particularly preferred.

The adhesive primer layer in general preferably has a thickness of from 0.01 to 10 μm. The adhesive primer layer may be previously applied to the metal blank or may be previously applied to the film such as a polyester film.

In the laminate for use in the present invention, the inside surface of the seamless can is provided with the above-described film such as a polyester film. The outside surface of the seamless can may comprise the same film as used on the inside surface, or a known coating for cans may be applied thereon.

Examples of the outside surface protective film include a thermosetting resin coating such as a phenol-formaldehyde resin, a furan-formaldehyde resin, a xylene-formaldehyde resin, a ketone-formaldehyde resin, an urea formaldehyde resin, a melamine-formaldehyde resin, an alkyd resin, an unsaturated polyester resin, an epoxy resin, a bismaleimide resin, a triallylcyanurate resin, a thermosetting acrylic resin, a silicone resin and an oily resin, and a thermoplastic resin coating such as a vinyl chloride-vinyl acetate copolymer, a vinyl chloride-malic acid copolymer, a vinyl chloride-maleic acid-vinyl acetate copolymer, an acrylic polymer and a saturated polyester resin. These resin coatings may be used either individually or in a combination of two or more thereof.

The seamless can of the present invention is produced by drawing/deep-drawing the above-described thermoplastic resin-metal laminate between a punch having specific dotted recessions and a die to form it into a cup having a bottom, and bend-elongating or further ironing at the deep-drawing stage to reduce the thickness of the side wall portion of the cup.

The punch used at the final stage of this forming has a large number of dotted recessions formed on a part of or over the entire surface of its side wall. The individual dotted recessions preferably have an area of from 0.03 to 0.8 mm² and a height of from 0.1 to 2.0 μm, and the ratio of the area occupied by the dotted recessions is preferably from 5 to 50% per unit area of the parts having the dotted recessions. The inner surface resin layer of the laminate is engaged with this punch and redrawn to transfer the dotted recessions of the punch onto the inner surface of the side wall resin layer as the dotted projections.

The shape and the disposition of the dotted recessions of the punch are as described above, however, details of the punch are also described in JP-B-1-46205. Examples of the material for the punch include cemented carbide. The dotted recessions are formed by a known working means such as ultrasonic working, ion irradiation, laser working or electron beam irradiation.

Furthermore, in order to improve the abrasion resistance of the punch and to reduce the friction force against the material to be processed, a thin film such as a titanium nitride or chromium nitride film may be coated on the surface of the punch.

Figure 10:
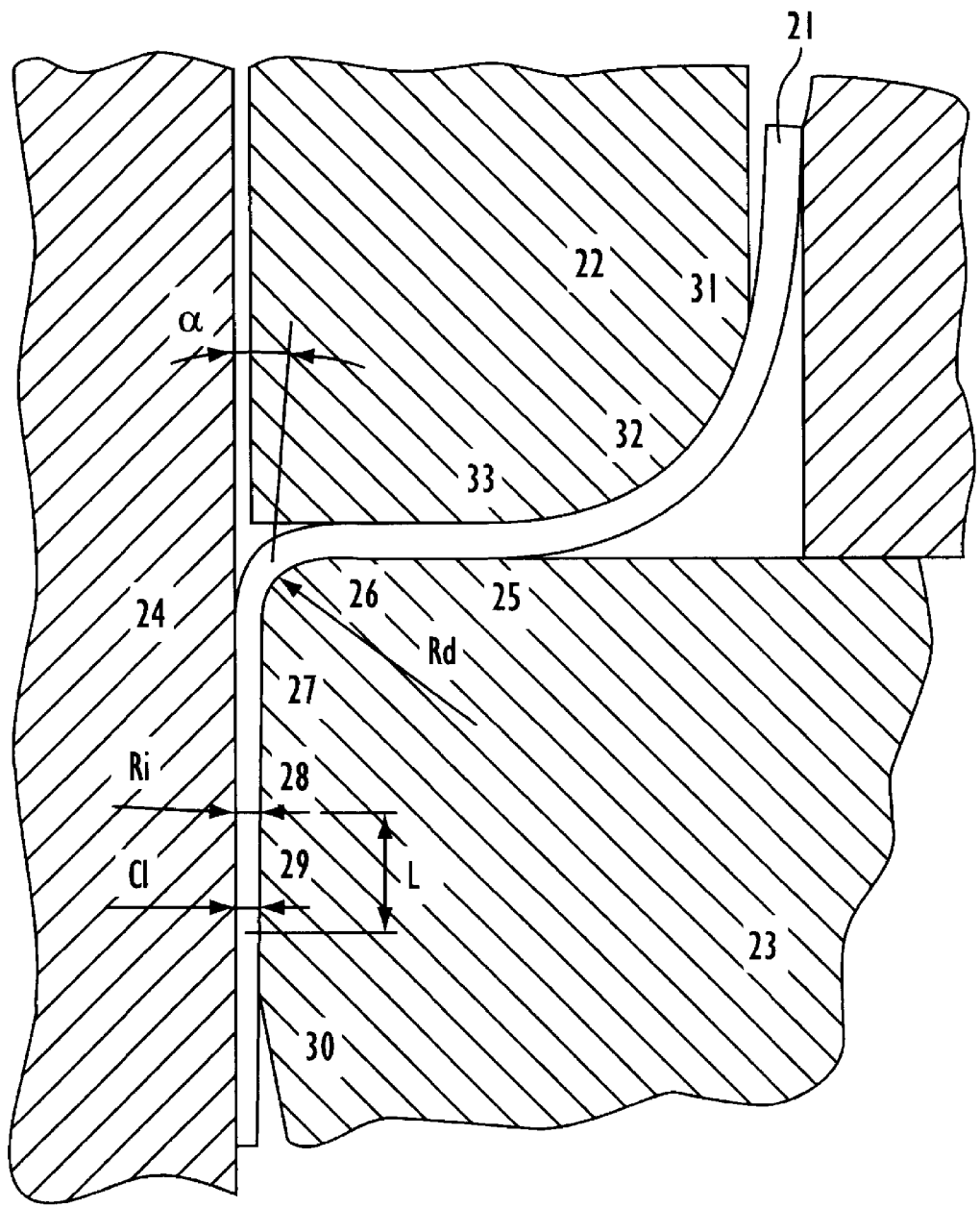
FIG. 10 is an explanatory view of the drawing-ironing formation of the laminate.

The drawing-ironing formation of the laminate is performed as follows. As shown in FIG. 10, the pre-drawn cup 21 formed from a coated metal sheet is held by an annular holding member 22 inserted in the cup and a redrawing die 23 disposed beneath the member. Concentric with the holding member 22 and the redrawing die 23, a redrawing punch 24 is provided removably in or out of the holding member 22. The redrawing punch 24 and the redrawing die 23 are moved relative to each other so as to mesh with one another.

The redrawing die 23 has a plane part 25 at its upper portion, a working corner part 26 having a small radius of curvature at the periphery of the plane part, a tapered approach part 27 having a diameter which increases downwardly on the periphery connected to the working corner part, and a cylindrical land part for ironing (ironing part) 29 connected to the approach part through a small curvature part 28. A reverse-tapered recess 30 is provided at the lower part of the land part 29.

The side wall portion of the pre-drawn cup 21 is vertically bent inward of the diameter upon passing through the outer peripheral surface 31 of the annular holding member 22 and the curvature corner part 32 thereof, bent nearly vertically in the axial direction at the working corner part 26 of the redrawing die 23 upon passing through the part defined by an annular bottom surface 33 of the annular holding member 22 and the plane part 25 of the redrawing die 23, and formed into a deep-drawn cup having a size smaller than that of the pre-drawn cup 21. In this case, at the working corner part 26, the portion opposite the side in contact with the corner part 26 is elongated by bending deformation. On the other hand, the portion in contact with the working corner part is elongated by return deformation after leaving the working corner part, to thereby achieve a reduction in the thickness of the side wall portion by bend-elongating.

The outer surface of the side wall portion reduced in thickness by bend-elongation comes into contact with the approach part 27 having a small taper angle with a gradually increasing diameter, and then, while leaving the inner surface in the free state, is guided into the ironing part 29. The travel of the side wall portion passing through the approach part is a prestage of the ironing subsequent thereto, where the bent-elongated laminate is stabilized and the size of the side wall portion is slightly contracted to prepare for ironing. More specifically, immediately after bend-elongation, the laminate is in an instable state. That is, the laminate remains under the influence of vibration due to the bend-elongation and also the inside of the film (resin layer) is distorted. Accordingly, smooth ironing cannot be achieved if the laminate is immediately subjected to ironing. However, according to the present invention, the outer surface side of the side wall portion is placed in contact with the approach part 27 to contract the diameter and lay the inner surface side in the free state. This terminates the influence of vibration and relaxes the heterogenous distortion within the film. As a result, smooth ironing can be achieved.

The side wall portion after the passing through the approach part 27 is introduced into the clearance between the land part for ironing (ironing part) 29 and the redrawing-ironing punch 24 and rolled to the thickness defined by the clearance (C1). In the present invention, the final thickness C1 of the side wall portion, in view of the balance in orientation of the polyester or the like, is from 30 to 100%, preferably from 30 to 85%, of the original thickness (t) of the laminate. The small curvature part 28 at the introduction side of the ironing part effectively fixes the starting point of ironing to thereby achieve smooth introduction of the laminate into the ironing part 29. The reverse-tapered recess 30 at the lower part of the land part 29 prevents an excessive increase in the working force.

The radius of curvature Rd of the curvature corner part 26 in the redrawing-ironing die 23 is preferably 2.9 times or less, more preferably 2.0 times or less, the thickness (t) of the laminate to provide effective bend-elongation. However, the laminate may be broken if the radius of curvature is too small. Thus, the radius of curvature is 1.0 times or more, preferably 1.3 times, the thickness (t) of the laminate.

The approach angle α (half of the taper angle) of the tapered approach part 27 is preferably from 1° to 8°, more preferably from 2° to 5°. If the angle of the approach part is less than the above-described range, the relaxation of orientation in the resin layer such as a polyester film or the stabilization before ironing is insufficient, whereas if the angle of the approach part exceeds the above-described range, the bend-elongation is non-uniform (return deformation is insufficient). As a result, it becomes difficult to effect smooth ironing without causing cracking or peeling of the film.

The clearance between the land part 28 for ironing and the redrawing-ironing punch 24 is in the range as described above, and the land length L in general is preferably from 0.5 to 3.0 mm, more preferably from 0.5 to 2.0 mm. If the length exceeds the above-described range, the working force tends to excessively increase, whereas if L is less than the above-described range, the abrasion rate of the tools disadvantageously increases.

Of course, in reducing the thickness only by bend-elongation, the ironing part 29 may be omitted and redrawing may be performed by bend-elongation.

In the present invention, at the time of reducing the thickness of the side wall portion by the above-described bend-elongation or ironing, a large number of dotted projections are formed on the inner surface of the side wall resin layer. These projections form a part for relaxing the molecular orientation of the side wall resin layer in the can height direction, to thereby prevent cracking when the can is impacted.

Furthermore, by forming a large number of dotted projections on the inner surface of the side wall resin layer, the stripping load of the can from the punch is reduced, the build-up of resin onto the punch is decreased, barrel breakage or roll back as problems encountered in continuous can-making can be prevented, and continuous can-making productivity is improved.

In the present invention, the thermoplastic resin layer at the flange portion is subjected to severe double seam working. Accordingly, a flange forming portion having a thickness larger than the thickness of the side wall portion of the can is formed at the upper end of the can side wall portion after ironing. The thickness t2 of the can flange varies depending on the thickness of the cover sheet, but it is preferably from 0.1 to 0.4 mm, more preferably from 0.15 to 0.25 mm.

In making a seamless can of the present invention, the thermoplastic resin layer on the surface provides sufficiently high lubrication performance. However, in order to further increase lubricity, a lubricant selected from various fats and oils or waxes may be coated in a small amount. An aqueous coolant (including that used for cooling the work) containing a lubricant may of course be used, but this is not preferred in view of maintaining a simple operation.

The temperature at the time of redrawing-ironing working (the temperature immediately after completing the ironing) is preferably from 10° C. to a temperature 50° C. higher than the glass transition temperature (Tg) of the resin such as polyester. Accordingly, the tools are preferably heated or cooled as needed.

According to the present invention, the container after the drawing formation can subsequently be subjected to heat treatment at least in one stage. The heat treatment is performed for various purposes and mainly for removing the distortion remaining in the film due to working, for evaporating the lubricant from the surface used at the time of working, and for dry-hardening the printing ink printed on the surface. The heat treatment may use a known heating apparatus such as an infrared heater, a hot blast circulating furnace or an induction heating apparatus. Furthermore, the heat treatment may be conducted in one stage or in two or more stages. The heat treatment temperature is suitably from 180° to 240° C. The heat treatment time is generally on the order of from 1 to 10 minutes.

The container after heat treatment may be abruptly cooled or may be left standing to cool. In the case of abrupt cooling, an abrupt cooling means such as cold air blowing or cold water sprinkling may be used.

The can thus obtained may be subjected, if desired, to one-stage or multi-stage neck-in working and to flange working to produce a can for double-seaming.

Furthermore, the can side wall may be processed into a circumferential polyhedron wall comprising minimum constituent unit faces as shown in FIGS. 11(a) and 11(b) and FIGS. 12(a) and 12(b) according to the technique described in JP-B-7-5128. FIGS. 11(a) and 11(b) show one example of the constituent unit face. The constituent unit face as a specific example is a rhombus having a dimension L in the axis direction and a dimension D in the circumferential direction. The side 41 of the rhombus is positioned in the outer direction of the diameter to a greater extent than the face 42. The line connecting the apexes 43 and 43 is recessed by the distance $d_0$ towards the can center to a greater extent than the apexes 44 and 44 in a vertically adjacent position. The upper surface 45 and the lower face 46 of the constituent unit face are connected through a smooth face 47 and the recession distance $d_1$ thereof is smaller than $d_0$. The can having such a structure is advantageous in that a large can strength can be obtained with a relatively small wall thickness.

The present invention is described in greater detail below with reference to the following Examples. However, the present invention should not be construed as being limited thereto.

The characteristic values reported herein were determined according to the following measuring methods.

(1) Measurement of Area Ratio of Projections

A deep-drawn cap having projections formed on the can side wall inner surface using a punch having recessions on its side wall surface, was measured with respect to the area ratio of the projections on the inner surface of the side wall resin layer by means of a three dimensional surface roughness tester (Surfcom 575A-3DF, manufactured by Tokyo Seimitsu KK). The measurement conditions were such that the longitudinal magnification was 10,000 times, the cut-off value was 0.8 mm and the measurement range was 4 mm×4 mm. A dotted projection was defined as a portion that is 0.1 μm higher than the reference plane (the resin layer surface when projections are not provided), and the area ratio was obtained from the total area S (mm²) of the projections present in the measurement range according to the following formula:

Area ratio (%)=S/16×100

(2) Storage Test

After a can filled with cola was allowed to lie sideways, a steel rod having a diameter of 65.5 mm was placed at 5° C. beneath the neck portion of the can positioned on an axis line perpendicular to the rolled direction of the metal sheet. A weight of 1 kg was dropped from a height of 60 mm to impact the can. Additionally, the point of 2 cm below the neck portion of the can was impacted in the same manner. Thereafter, the can was subjected to a storage test at a temperature of 37° C. and the dissolved iron weight (average of five cans) in the can after one year was measured by an induced plasma emission analysis method. At the same time, the state of the can inner surface was observed. In Example 13, a can was filled with milk coffee, and after retort sterilization at 125° C. for 30 minutes, the can was impacted in the same manner as described above, and followed by storage testing.

(3) Preparation of Laminated Metal Sheet

A copolyester (Tm=228° C.) prepared from terephthalic acid/isophthalic acid (88/12 by mol) and ethylene glycol was drawn at 120° C. to 3.0 times in the longitudinal direction and to 3.0 times in the transverse direction, and then heat-fixed at 180° C. to obtain a biaxially stretched film having a thickness of 25 μm. Thereafter, on both surfaces of a tin-free steel (TFS) sheet having a blank thickness of 0.18 mm and a tempering degree of DR-6, the biaxially stretched film was heat-laminated at a sheet temperature of 240° C., a laminate roller temperature of 150° C. and a sheet traveling rate of 40 m/min. Immediately thereafter, the sheet was cooled with water to obtain a laminated metal sheet.

(4) Measurement of Difference in Birefringence between Parts Not Having Dotted Projections and Dotted Projections of the Side Wall Resin Layer In the vicinity of the axis line in a direction perpendicular to the rolled direction of the metal sheet, the dotted projections and the parts not having the dotted projections at the same height of the can barrel side wall portion were cut into 5 mm squares. The metal sheet of each sample thus obtained was dissolved in a 50% hydrochloric acid to isolate the remaining film. Then, the film pieces were dried under vacuum for at least 24 hours to obtain samples for measuring the difference in birefringence.

Each of the samples was wrapped and buried in an epoxy resin and sliced to a thickness of 3 μm (particularly, the sample of the dotted projections was sliced to a thickness of 3 μm with a center being placed on the projected part) in parallel to the thickness direction (corresponding to $n_r$) and to the can axis direction (can height direction). The retardation was measured through a polarization microscope, and the birefringence was determined as an average of values in the area from the film surface to a depth of 2 μm. The difference in birefringence was obtained by subtracting the birefringence value of the dotted projections from the birefringence at the parts not having the dotted projections. A wavelength of 546 nm was used for this measurement.

EXAMPLE 1

A laminated metal sheet applied by a wax-base lubricant was punched into a disk having a diameter of 166 mm to obtain a shallow-drawn cup having a drawing ratio of 1.65. The resulting cup was subjected to drawing-ironing formation as shown in FIG. 10 in combination with redrawing for reducing the wall thickness, using a transfer press of 100 strokes/min according to a conventional method to obtain a deep-drawn cup. At the time of this drawing-ironing formation, projections were formed on the inner surface of the side wall resin layer using a punch having recessions formed over the entire surface of the punch side wall by ultrasonic working. As a result, the projections shown in Table 1, Example 1, were formed on the inner surface of the side wall resin layer. The shape and area ratio of the thus-formed projections were measured using a contact three-dimensional roughness gauge. The deep-drawn cup thus obtained had the properties shown below. The continuous can-making property was evaluated in terms of rollback generation on continuously making 10,000 cans. The results obtained are shown in Table 1. No rollback occurred.

| | |
|---|---|
| Cup size | 66 mm |
| Cup height | 128 mm |
| Thickness t1 of can side wall portion to blank thickness | 65% |
| Thickness t2 of upper portion of the can side wall to blank thickness | 77% |

The resulting deep-drawn and ironed cup was domed in a customary manner, and then heat treated at 215° C. After cooling, the cup was trimmed at its open edge portion, printed on the curved surface thereof, dried to complete the printing step and flanged to obtain a 350 g-volume seamless can. The can was then filled with cola and subjected to storage testing. The results obtained are shown in Table 1.

As a result of this evaluation, the seamless can exhibited good continuous can-making properties and provided excellent shock resistance (dent resistance).

EXAMPLES 2 TO 12

Cans were produced in the same manner as in Example 1, except that the recessions were formed over the entire surface of the punch side wall portion by ultrasonic working such that the projections shown in Table 1 were provided on the inner surface of the side wall resin layer. The results obtained are shown in Table 1. Under all conditions, rollback was not generated during continuous can-making and good impact resistance was obtained in the storage test.

EXAMPLE 13

A 350 g-volume seamless can was produced in the same manner as in Example 1. The can side wall portion was processed to have 11 minimum constituent unit faces each having an L/W of 0.96 and a depth ratio $d_1/d_0$ of 0.95 as shown in FIGS. 11(a) and 11(b) according to the technique described in JP-B-7-5128. The unit faces were provided continuously in the circumferential direction including the center of the can height at a phase difference of ½ in the can height direction in extent of a width of 90 mm to obtain a seamless can as shown in FIGS. 12(a) and 12(b). The thus-obtained can was filled with milk coffee, and after retort sterilization, the can was subjected to storage testing. The results obtained are shown in Table 1. Rollback was not generated in continuous can-making, and good impact resistance was obtained in the storage test.

EXAMPLE 14

A can was produced in the same manner as in Example 1, except for providing recessions by ultrasonic working on the punch side wall part corresponding to the portion of from 30 to 100 mm in the can height direction so as to obtain the inner surface side wall resin layer projections as shown in Table 1, Example 14. The can was evaluated with respect to continuous can-making and storage properties. The results thus obtained are shown in Table 1. Rollback was not generated in continuous can-making, and good impact resistance was obtained in the storage testing.

EXAMPLE 15

A 350 g-volume seamless can was produced in the same manner as in Example 1, except for using an aluminum 3004 alloy having a blank thickness of 0.26 mm as a laminate substrate. Rollback was not generated in the continuous can-making. In the cola storage test, corrosion was not observed on the can inside surface, and the aluminum dissolving weight measured by an induced plasma emission analysis method was 0.1 ppm or less.

COMPARATIVE EXAMPLE 1

A can was produced in the same manner as in Example 1, except for using a punch having no recessions on the punch side wall so as not to form projections on the inner surface of the side wall resin layer. The can was evaluated with respect to continuous can-making and storage properties in the same manner as in Example 1. The results thus obtained are shown in Table 1. Rollback did occur in the continuous can-making. The press was stopped when rollback occurred. After taking out the rollbacked can, the formation was performed until 10,000 cans were produced. In the storage test, the impacted upper portion of the can was slightly corroded, and the iron dissolving weight accompanying this corrosion was large as compared with the Examples of the invention. These results demonstrate that the comparative can having no projections formed on the inner surface of the side wall resin layer was inferior in productivity and impact resistance to the cans of the present invention.

COMPARATIVE EXAMPLES 2 TO 7

Cans were produced in the same manner as in Example 1, except for providing recessions by ultrasonic working over the entire surface of the punch side wall so as to form projections on the inner surface of the side wall resin layer which did not satisfy the required features of the present invention. The cans were evaluated with respect to continuous can-making and storage properties in the same manner as in Example 1. The results thus obtained are shown in Table 1. Rollback occurred in the continuous can-making. The press was stopped when rollback occurred. After taking out the rollbacked can, the formation was performed until 10,000 cans were produced. In the storage test, the impacted upper portion of each can was corroded, and the iron dissolving weight accompanying this corrosion was large. These results confirm that the comparative cans were inferior in productivity and impact resistance to the cans of the present invention.

COMPARATIVE EXAMPLE 8

A can was produced in the same manner as in Example 1, except for providing recessions by ultrasonic working over the entire surface of the punch side wall portion so as form projections linearly on the inner surface of the side wall resin layer as shown in Table 1. The can was evaluated with respect to continuous can-making and storage properties in the same manner as in Example 1. The results thus obtained are shown in Table 1. Rollback occurred in the continuous can-making. The press was stopped when rollback occurred. After taking out the rollbacked can, the formation was performed until 10,000 cans were produced. In the storage test, the impacted upper portion of the can was corroded, and the iron dissolving weight accompanying this corrosion was large. These results confirm that the comparative can was not suitable for practical use in view of productivity and impact resistance.

TABLE 1

| | Area (mm$^2$) | Height (μm) | Area Ratio (%) | Pitch 1[1] (mm) | Pitch 2[2] (mm) | Difference in Bire-fringence | Shape of Projection | Disposition Pattern of Projections | Rollback Generation Ratio (%) | State of Can Inner Surface | Iron Dissolving Weight (ppm) |
|---|---|---|---|---|---|---|---|---|---|---|---|
| Example 1 | 0.13 | 0.5 | 16.3 | 0.9 | 1.0 | 0.020 | circle | slanted checker | 0 | Good | 0.08 |
| Example 2 | 0.05 | 0.2 | 6.3 | 0.8 | 1.0 | 0.010 | circle | slanted checker | 0 | Good | 0.23 |
| Example 3 | 0.05 | 1.8 | 7.8 | 0.8 | 0.8 | 0.072 | circle | checker | 0 | Good | 0.20 |
| Example 4 | 0.70 | 0.2 | 8.8 | 4.0 | 2.0 | 0.010 | circle | slanted checker | 0 | Good | 0.15 |
| Example 5 | 0.70 | 1.8 | 8.8 | 2.0 | 4.0 | 0.070 | circle | slanted checker | 0 | Good | 0.25 |
| Example 6 | 0.06 | 0.2 | 48.8 | 0.3 | 0.4 | 0.012 | circle | checker | 0 | Good | 0.31 |
| Example 7 | 0.06 | 1.8 | 46.0 | 0.3 | 0.4 | 0.075 | circle | checker | 0 | Good | 0.37 |
| Example 8 | 0.60 | 1.8 | 45.0 | 1.0 | 1.5 | 0.073 | circle | checker | 0 | Good | 0.35 |
| Example 9 | 0.60 | 0.2 | 48.8 | 1.0 | 1.5 | 0.008 | circle | slanted checker | 0 | Good | 0.35 |
| Example 10 | 0.13 | 0.5 | 16.3 | 0.9 | 1.0 | 0.022 | ellipse[3] | slanted checker | 0 | Good | 0.08 |
| Example 11 | 0.12 | 0.5 | 15.0 | 0.9 | 1.0 | 0.020 | square | slanted checker | 0 | Good | 0.09 |
| Example 12 | 0.18 | 0.5 | 22.5 | 0.9 | 1.0 | 0.025 | equilateral triangle | slanted checker | 0 | Good | 0.08 |
| Example 13 | 0.13 | 0.5 | 16.3 | 0.9 | 1.0 | 0.020 | circle | slanted checker | 0 | Good | 0.08 |
| Example 14 | 0.13 | 0.5 | 16.3 | 0.9 | 1.0 | 0.020 | circle | slanted checker | 0 | Good | 0.14 |
| Comparative Example 1 | — | — | — | — | — | | — | — | 0.20 | Can upper portion was slightly corroded. | 0.68 |
| Comparative | 0.13 | 0.5 | 3.3 | 2.0 | 2.0 | 0.020 | circle | checker | 0.20 | Can upper portion | 0.72 |

TABLE 1-continued

| | Area (mm²) | Height (μm) | Area Ratio (%) | Pitch 1[1] (mm) | Pitch 2[2] (mm) | Difference in Birefringence | Shape of Projection | Disposition Pattern of Projections | Rollback Generation Ratio (%) | State of Can Inner Surface | Results of Storage Testing Iron Dissolving Weight (ppm) |
|---|---|---|---|---|---|---|---|---|---|---|---|
| Example 2 | | | | | | | | | | was corroded. | |
| Comparative Example 3 | 0.13 | 0.5 | 65.0 | 0.4 | 0.5 | 0.021 | circle | checker | 0.25 | Can upper portion was corroded. | 1.47 |
| Comparative Example 4 | 0.02 | 0.5 | 16.3 | 0.4 | 0.3 | 0.018 | circle | checker | 0.05 | Can upper portion was corroded. | 1.01 |
| Comparative Example 5 | 0.13 | 3.0 | 16.3 | 0.9 | 1.0 | 0.182 | circle | slanted | 0.04 | Can upper portion was corroded. | 1.13 |
| Comparative Example 6 | 2.00 | 0.5 | 25.0 | 2.0 | 2.0 | 0.020 | circle | checker | 0.22 | Can upper portion was corroded. | 0.81 |
| Comparative Example 7 | 0.13 | 0.02 | 16.3 | 0.9 | 1.0 | 0.001 | circle | slanted | 0.18 | Can upper portion was corroded. | 1.25 |
| Comparative Example 8 | 0.40 | 0.5 | 20.0 | 0.5 | 2.0 | 0.022 | linear[4] | checker | 0.32 | Can upper portion was corroded. | 4.66 |

[1]Distance between centers of the projections in the adjacent lines in the row of projections aligned in the can height direction.
[2]Distance between centers of the projections in the adjacent rows in the line of projections aligned in the can circumferential direction.
[3]An ellipse having a length/width ratio of 2:1.
[4]A line having a width of 0.2 mm and a length of 2 mm.

According to the present invention, a large number of dotted projections are formed on a part of or over the entire inner surface of the side wall resin layer. These dotted projections relax the orientation of the side wall resin layer. As a result, even when the can is subjected to a denting test, the problem of thermoplastic resin layer cracking can be sufficiently overcome and after impact, the corrosion resistance and the metal exposure inhibitory properties are remarkably improved. Furthermore, according to the present invention, a large number of dotted projections are formed on the inner surface of the side wall resin layer using a punch having dotted recessions. Consequently, the stripping load of the can from the punch is decreased, resin build-up on the punch is reduced, and barrel breakage and rollback which are problems in continuous can-making are effectively prevented. As a result, the continuous can-making productivity is improved.

While the invention has been described in detail and with reference to specific embodiments thereof, it will be apparent to one skilled in the art that various changes and modifications can be made therein without departing from the spirit and scope thereof.

What is claimed is:

1. A shock resistant seamless can comprising a side wall having an inside surface and an outside surface formed from a laminate of a metal substrate and a thermoplastic resin layer provided on the inside surface of the can side wall, wherein the inner surface of the side wall resin layer opposite the metal substrate comprises a plurality of dotted projections.

2. The seamless can as claimed in claim 1, wherein the dotted projections are present on a part of or over the entire inner surface of the side wall resin layer.

3. The seamless can as claimed in claim 1, wherein the dotted projections are present over the entire inner surface of the side wall resin layer.

4. The seamless can as claimed in claim 1, wherein the resin of the side wall resin layer is molecularly oriented in the can height direction, and the orientation is relaxed at the dotted projections.

5. The seamless can as claimed in claim 1, wherein the resin of the side wall resin layer is molecularly oriented in the can height direction, the dotted projections of the resin layer have a birefringence ($\Delta n_p$) that is smaller than the birefringence of the parts of the resin layer which do not have the dotted projections ($\Delta n_0$), and the difference in birefringence ($\Delta n_0 - \Delta n_p$) between the parts of the resin layer which do not have the dotted projections and the dotted projections of the resin layer, determined by a birefringence method and where birefringence ($\Delta n$) is defined by the following formula (1), is from 0.002 to 0.180:

$$\Delta n = n_h - n_t \quad (1)$$

wherein nh is the refractive index of the resin layer in the can height direction and $n_t$ is the refractive index in the thickness direction of the resin layer.

6. The seamless can as claimed in claim 5, wherein the thermoplastic resin layer comprises a polyester or a copolyester.

7. The seamless can as claimed in claim 1, wherein the individual dotted projections have an area of from 0.03 to 0.8 mm² and a height of from 0.1 to 2.0 μm, and the ratio of the area occupied by the dotted projections is from 5 to 50% per unit area of the parts having the dotted projections.

8. The seamless can as claimed in claim 7, wherein the thermoplastic resin layer comprises a polyester or a copolyester.

9. The seamless can as claimed in claim 1, wherein the thermoplastic resin layer comprises a polyester or a copolyester.

* * * * *